United States Patent [19]

Asjes et al.

[11] 4,412,317

[45] Oct. 25, 1983

[54] TRANSDUCER FOR PICKING UP MECHANICAL VIBRATIONS, IN PARTICULAR SEISMIC WAVES, AND A SEISMIC MEASURING SYSTEM INCLUDING SUCH A TRANSDUCER

[75] Inventors: Ronald J. Asjes, Valkenswaard; Jacobus C. L. van Peppen, Delft; Klaas B. Klaassen, 's-Gravenzande, all of Netherlands

[73] Assignee: De Regt Special Cable B.V., Capelle a/d Ijssel, Netherlands

[21] Appl. No.: 218,090

[22] Filed: Dec. 19, 1980

[30] Foreign Application Priority Data

Dec. 21, 1979 [NL] Netherlands ..................... 7909287

[51] Int. Cl.³ ........................................... H04R 11/00
[52] U.S. Cl. ..................................... 367/185; 367/187; 367/154
[58] Field of Search ............... 367/185, 187, 153, 154; 73/652, 654; 181/122

[56] References Cited

U.S. PATENT DOCUMENTS

| | | | |
|---|---|---|---|
| 2,740,946 | 4/1956 | Geneslay | 367/187 |
| 3,239,804 | 3/1966 | Elskamp et al. | |
| 3,311,872 | 3/1967 | Andrews, Jr. et al. | 367/153 |
| 3,412,376 | 11/1968 | Johnson | |
| 3,451,040 | 6/1969 | Johnson | |
| 3,559,050 | 1/1971 | Mifsud | |
| 3,577,184 | 5/1971 | McNeel et al. | |
| 3,582,874 | 6/1971 | Fedoseenko et al. | |
| 3,718,900 | 2/1973 | Holmes, Jr. | |
| 3,742,441 | 6/1973 | Riley | |

Primary Examiner—Theodore M. Blum
Attorney, Agent, or Firm—Weingarten, Schurgin, Gagnebin & Hayes

[57] ABSTRACT

Transducer for converting mechanical vibrations into corresponding electrical signals. Two separate coils are disposed in permanent magnetic fields produced by a magnet assembly. The coils on the one hand and the magnetic assembly on the other are mounted for movement relative to each other. The magnet assembly is structured and disposed relative to said two coils respectively so as to reduce the electromagnetic coupling between the two coils to zero, while having an electromagnetic coupling only between a respective one of said coils and said magnet assembly. In a composite seismometer comprising a transducer of the above-described type and an amplifier, one of said coils is connected to the amplifier input, while the other one of said coils is included in a feedback circuit for said amplifier. When mechanical vibrations are applied to the composite seismometer, the velocity difference between the inertial mass of the transducer and the housing thereof is reduced to zero by the action of the electromagnetic forces caused by the current transversing said coil included in said feedback circuit.

27 Claims, 4 Drawing Figures

TRANSDUCER FOR PICKING UP MECHANICAL VIBRATIONS, IN PARTICULAR SEISMIC WAVES, AND A SEISMIC MEASURING SYSTEM INCLUDING SUCH A TRANSDUCER

The invention relates to a transducer for picking up mechanical vibrations, in particular seismic waves, and a seismic measuring system including such a transducer. More particularly, the invention relates to transducers intended for seismic exploration, in which in order to obtain information on the soil conditions at a given depth, different layers of the earth are excited and the response of the surface of the earth thereto is measured. Such a method may employ either refraction measurements or reflection measurements, which measurements relate to mechanical vibrations of the earth surface relative to a fixed position.

Known transducers suiting such purposes are adapted to determine the relative displacement of a frame rigidly attached to the earth surface relative to a mass inertial system. In these measurements, in principle, two measuring planes can be distinguished, i.e. the horizontal plane and a plane normal thereto. For exploration purposes, practically only measurements in the last-named, vertical plane are performed. In such measurements, the longitudinal and transversal wave propagating in the horizontal plane are to be considered as noise signals.

In known transducers for exploration equipment, the magnet or the magnet system is fixedly connected to the housing of the transducer. In such arrangements, the coil system serves as an inertial mass supported in the housing by means of springs. In known transducers, such as for example the types SM-4, 6,7 of Sensor B.V., The Hague, or types L-28,100 of Applied Magnetics/Geospace Corporation, Houston, Tex., a constant fixed damping is used as one or more short-circuited windings are mounted on the coil body. This damping may be further increased by connecting a damping resistor across the output coil. Such known transducers have a fixed natural resonant frequency determined by the mass and the spring constant; above this fixed natural resonant frequency, these transducers may be used as velocity-sensitive pick-up devices.

U.S. Pat. No. 3,582,874 (N. E. Fedoseenko) discloses a transducer arrangement in which the natural resonant frequency and the damping are adjustable in stepless fashion. In this known electrodynamic seismic transducer the rest position of a magnet system movably supported in the transducer housing, which magnet system serves in principle as the inertial mass, can be adjusted by means of a variable magnet mounted exterior of the transducer housing. A second magnet mounted exterior of this housing may be used for regulating the damping. These two magents mounted exterior of the housing determine in combination the natural resonant frequency of the transducer. As a result thereof, it is possible to use the transducer for picking up seismic signals of very low frequency, and to perform measurements throughout a wide range of temperatures without specific compensating means being required.

In all of the known transducers of the above types, the measurements are performed above the natural resonant frequency and, in principle, these transducers are therefore velocity-sensitive pick-up devices. In other words, the output signal produced thereby is indicative of the first time-derivative of the external mechanical displacement imparted to the transducer.

The measurement of frequencies that are considered as being relatively low in the exploration field requires the inertial mass of the transducer to be relatively large and/or the stiffness of the springs supporting this mass to be relatively slight. This entails the drawback of such transducers being relatively vulnerable and requiring careful handling.

A transducer lacking this drawback is known from U.S. Pat. No. 3,559,050 (J. F. Mifsud). This known transducer comprised a housing having a magnet assembly fixedly mounted therein for producing permanent magnetic fields, and a coil system movably supported in this housing, which coil system includes two separate coils mounted coaxially and in line with each other in the permanent magnetic fields produced by the magnet assembly.

The primary object of this known arrangement is to artificially reduce the natural resonant frequency of the transducer without achieving a structural arrangement having the drawbacks mentioned above in connection with known transducers of the type as disclosed in the Fedoseenko patent. To achieve this object, the Mifsud patent proposes an arrangement in which the electric current traversing one coil of the coil system, i.e. the coil connected to the output of an amplifier, leads (preferably 90°) relative to the electric current traversing the other coil of the coil system, i.e. the coil connected to the input of this amplifier. As a result thereof, the effective mass of the transducer appears to have been artificially increased. This patent further indicates that the transducer may be used as an acceleration-responsive pick-up device if the phase difference between these two electric currents is zero, in which respect the patent describes specific conditions which the numbers of turns of the two coils should then satisfy. In principle, an acceleration-responsive transducer has the advantage that the frequency characteristic increases with 6 db per octave relative to the frequency characteristic of the conventional velocity-sensitive transducer.

It is a general object of the invention to provide a transducer suitable for picking up mechanical vibrations, in particular seismic waves, which transducer is an improvement over the known arrangements described above.

More particularly, it is an object of the invention to provide a transducer which may be used as an acceleration-responsive pick-up device over the entire frequency range of interest, which range is from two to approximately five hundred cycles for exploration purposes.

Another object is to provide a structural arrangement suitable for such an acceleration-responsive transducer, which arrangement (a) is rugged; (b) has a relatively slight volume and weight; (c) can be manufactured from cheap components requiring no critical characteristics; and (d) requires no trimming and only a minimum of maintenance.

A further object is to provide a transducer suitable for use in recently developed seismic investigation methods, such as for example the vibroseis method. In this method the soil to be investigated is continuously excited by a group of vibrators, in which a relatively strong surface wave (ground-roll) is present as a continuous wave. The reflection signals received are superposed on this strong ground-roll signal, so that a transducer of conventional design is driven far into the non-linear range, resulting in unacceptable distortions.

It is therefore a further object of the invention to provide a transducer suitable for use in such a seismic investigation method without such distortions in the output signal of the transducer occurring.

Still another object is to provide an accelerometer having a relatively high output impedance and capable of producing a strong output signal, which output signal has a substantially flat phase characteristic over the frequency range of interest.

These and other objects of the invention can be realized by arranging such a transducer so that the coupling factor indicative of the electromagnetic coupling between two coils of the coil system is substantially zero, and an electromagnetic coupling can exist only between a respective one of these two coils and the magnet assembly of the transducer.

According to the invention, a composite seismometer comprises a thus-arranged transducer and an amplifier having its input connected to one coil and having its output connected through a feedback circuit to the other coil of the coil system of the transducer, in which the velocity difference between the inertial mass of the transducer and the transducer housing is reduced to zero by the action of the electromagnetic forces caused as a result of the current traversing the coil included in the feedback circuit.

A preferred embodiment of a transducer according to the invention is characterized in that the coil system of the transducer is fixedly secured to the housing of the transducer, and the magnet assembly included in the transducer is supported for movement relative to this housing. By means of such a preferred embodiment it is possible to substantially fully eliminate any crosstalk between the two coils of the coil system in a simple and efficient manner, i.e. by providing the magnet assembly with two separate permanent magnets mounted in line with each other and coaxially relative to the two coils of the coil system, each one of these magnets being included in an associated one of two magnetic circuits having a common circuit portion constituting an electromagnetic short-circuit between the two coils. As a result thereof, a transducer according to the invention may be used as an acceleration-responsive pick-up device over the frequency band of interest, which device has a substantially flat phase characteristic over this frequency range while interfering effects do not affect the result of the measurements.

A composite seismometer employing a transducer according to the invention has the following advantages in brief summary:

the output signal representative of the acceleration as caused by the external forces acting on the transducer is an electric current or a low-impedance voltage derived therefrom; the properties of the support springs of the movable mass system of the transducer are not critical, in other words rotation-free springs having great stiffness in transverse direction may be employed, the magnet assembly is constructed so that it does not include members that rotate relative to each other, as a result whereof the support springs need not take up the large centring forces for the magnet assembly, and the response is independent of the spring properties; the force feedback used results in the absence of mechanical resonance and in independence of the load; the transfer characteristic is not influenced by connecting a plurality of transducers in series or in parallel; temperature-independent damping; the transducer may be used in any position and is sensitive only to axially directed displacements; it is possible to arrange the transducer so that it does not include movable electrical connections; the inertial mass of the transducer is slight; when using a two-conductor system it is possible to employ supply current modulation; the sensitivity of the transducer depends only on the feedback coil wire length within the magnetic field and the magnetic flux density of the field acting on this feedback coil, in which the measuring coil connected to the input of the amplifier need not be wound linearly and there is a high degree of freedom as to the choice of the wire length of this measuring coil; the allowed maximum soil vibration that can be picked up is limited only by the characteristics of the electronic components coupled to the transducer; in a preferred embodiment of the transducer it is possible to include the two permanent magnets of the magnet system in a magnetic assembly having two magnetic circuits interconnected by a common magnetic circuit portion, in which portion the static magnetic flux can be made substantially zero and the dynamic permeability can be given a high value, as a result whereof a high degree of electromagnetic insulation between the two coils can be realized; the phase characteristic is substantially flat over the entire bandwidth of interest; and the electronic components associated with a transducer can be mounted in the transducer housing. Furthermore, in accordance with the invention a thus-arranged seismometer permits integration of the output quantity, resulting in a velocity-sensitive seismometer having the advantages inherent in a transducer according to the invention.

The invention will be described in greater detail hereinafter with reference to the accompanying drawings, in which.

Figures 1, 2:
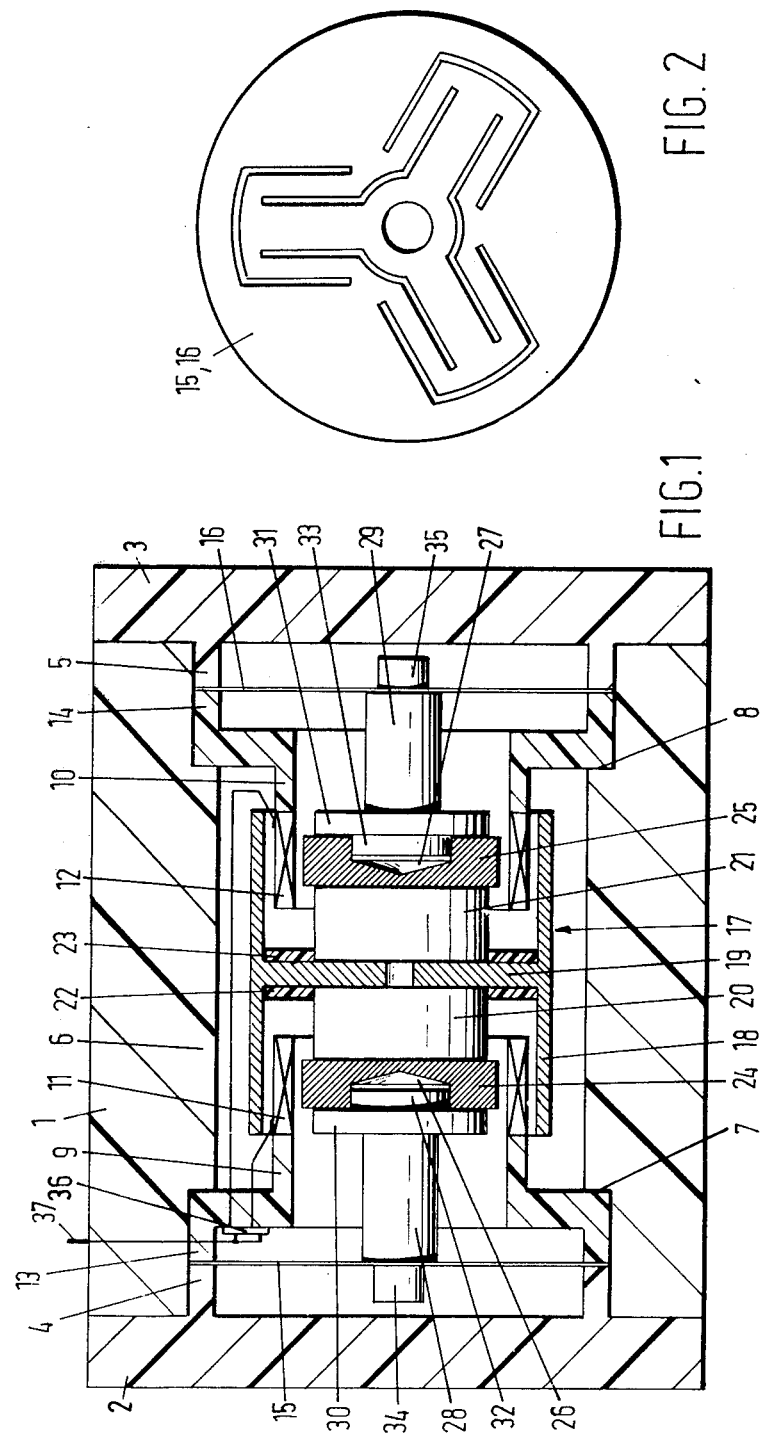
FIG. 1 shows, partly in cross-section, a preferred embodiment of a transducer according to the invention for picking up mechanical vibrations, in particular seismic waves.
FIG. 2 shows a top view of an embodiment of one of the two support springs used in the embodiment shown in FIG. 1.

The embodiment of a transducer according to the invention as shown in FIG. 1 comprises a hollow, open-ended cylindrical housing 1, which may be made of plastics material. The two ends of this housing may be hermetically sealed by means of a first cover 2 and a second cover 3. Each one of these covers includes an annular collar 4, 5 extending into the interior of the housing in accurately fitting fashion. Each one of these covers can be attached to the housing by adhesive bonding so as to heremetically seal this housing. The housing further comprises a wall portion 6 enlarged to provide annular support faces 7, 8 adjacent the two ends of the housing, which support faces extend transversally to the longitudinal axis of the housing. Each one of these support faces supports one of two coil frames 9, 10. Each coil frame supports in turn a schematically shown coil 11, 12. Furthermore, each coil frame includes a cylindrical flange 13, 14 the annular end face of which is located opposite to the end face of the collar 4, 5 of the respective cover 2, 3.

In the assembled state, a substantially circular, flat support spring 15, 16 is clamped between these opposing end faces. By means of these two support springs, a magnet assembly generally designated by reference numeral 17 is supported in the housing so that it is movable relative to this housing substantially only in axial direction. In fact, as shown in detail in FIG. 2, each one of the support springs is configured so that the magnet assembly is movable relative to the housing substantially only in axial direction; the stiffness of these springs in axial direction is not critical and is determined primarily on the basis of the consideration that, when the transducer is in a rest condition and undergoes no mechanical displacement, these springs are substantially flat and do not flex.

The magnet assembly 17 comprises the following components: a substantially cylindrical, hollow and open-ended magnet frame 18 having a central portion 19 located substantially halfway in its interior; substantially cylindrical, permanent magnets 20, 21 disposed to abut against this central portion; centring rings 22, 23 of non-magnetic material (for example plastics material) centring these magnets within the magnet frame; magnet pole rings 24, 25 abutting against the respective end faces of the magnets, which rings each include a central recess 26, 27 in its face remote from the associated magnet; and centring means 28, 29 of non-magnetic material (for example plastic material). Each one of these centring means has its end facing the centre of the magnet assembly provided with a support flange 30, 31 abutting against the associated magnet pole ring and a cylindrical fitting head 32, 33 received in the recess in the associated pole ring so that this pole ring is centred by the respective centring means. Each centring means further has its other end provided with a reduced cylindrical portion 34, 35 fittingly received in a central aperture of the respective support spring and serving as a stop member. By means of these stop members, the magnet assembly is prevented from undergoing undesirably large displacements relative to the housing when the coils are not energized, for example as caused by shocks occurring during transportation of the transducer.

In the embodiment of a transducer according to the invention as described above, the magnet assembly is supported by the two support springs so that it is movable relative to the housing, whereas the coil system including the two coils is fixedly mounted in this housing. Such an arrangement has the advantage that the electrical leads of the coil system can likewise be fixedly mounted relative to the housing, in other words that these leads are not part of the movable, inertial mass. A second advantage is achieved by means of a magnet assembly including no members that are movable relative to each other. In that case, the support springs need not take up the large centring forces required for making a narrow air gap. In principle, however, it is also possible to movably support the coil system in the housing and to fixedly mount the magnet assembly in this housing.

A transducer according to the invention is designed to constitute, in combination with an appropriate amplifier, in particular a differential amplifier, and electronic circuitry including a feedback circuit, a seismometer having such a feedback that the difference in velocity between the movable system, i.e. the inertial mass, and the housing of the transducer, as caused by mechanical movements (vibrations), in particular seismic waves to be picked up by the transducer, is reduced to zero due to the forces acting on the movable system as caused by electromagnetic interaction between the coil of the coil system that is included in the feedback circuit and the magnet assembly. In other words, the inertial mass of the transducer, in particular the magnet assembly, is stationary relative to the housing when the magnetic transducer is subjected to a mechanical vibration to be picked up. The electric current traversing the coil included in the feedback circuit is then indicative of the acceleration of the mechanical vibration to be picked up. In particular, this acceleration g is substantially directly proportional to this electric current I, in which the proportionality constant is represented by $B \cdot 1/m$, where B is the magnetic flux density in the air gap in which the coil included in the feedback circuit, the so-called drive coil, is located; 1 is the length of the wire from which this drive coil is wound and in so far as this coil is located in the field having magnetic flux density B; and m is the inertial mass of the movable system of the transducer.

In order to achieve a compact, rugged and non-bulky structure for a transducer having a high sensitivity as regards the measuring of accelerations, it is preferred to keep the mass m as small as possible and/or to select the parameters B and/or 1 as high as possible. In other words, it is preferred to use permanent magnets of small axial dimension, which magnets are capable of producing a high flux density B.

As in a transducer according to the invention the free path is reduced to substantially zero, there are no restrictions as to the mechanical vibrations to be picked up. In fact, the amplitude, dynamics and frequency range of the vibrations that can be picked up by a transducer according to the invention, are only determined by the characteristics of the electronic circuitry coupled to the transducer. In particular, there actually exists a direct dependence on the electric current to be applied to the transducer in order to keep the inertial mass of the transducer substantially in position relative to the housing.

The present invention further renders it possible to arrange a transducer so that crosstalk between the two coils of the coil system is effectively eliminated. Such crosstalk may have an interfering effect on the acceleration measurements particularly at higher frequencies, i.e. frequencies higher than approximately 300 cycles in the frequency range of interest. In a transducer according to the invention, in particular a transducer in which the coil system is fixedly mounted in the housing and the magnet assembly is movably supported in this housing, it is possible to efficiently eliminate such crosstalk by means of a simple arrangement occupying little space. For this purpose, the magnet assembly can be dimensioned so that the permeability in the central portion 19 of the magnet frame 18 has a high value for dynamic magnetic fields, so that this central portion 19 constitutes an electromagnetic short-circuit (low magnetic impedance) for the corresponding magnetic fluxes, as a result whereof a spurious electromagnetic field generated by one coil of the coil system has no influence on the other coil of the coil system.

Starting from given magnetic characteristics of the permanent magnets 20 and 21 used, the magnet frame 18 can be dimensioned so that an electro-magnetic short-circuit as formed by the aforesaid central portion 19 is created for dynamic electromagnetic fields. In this connection, it may be advantageous to mount the permanent magnets so that their mutually opposite poles face each other at this central portion 19, resulting in the two magnet pole rings 24 and 25 likewise having mutually opposite polarities.

In the embodiment shown in FIG. 1, the electronic circuitry is an integrated circuit, in which the substrate on which this integrated circuit is provided is mounted in the transducer housing, in particular on the coil frame 9. FIG. 1 schematically shows this substrate at 36. The coil leads and the terminals on the substrate are likewise schematically shown without the exact number of such leads and terminals being indicated. A thus-achieved "active transducer" can be connected to the external wiring by means of lead connectors, only one of which is shown in FIG. 1 at 37.

Figure 3:
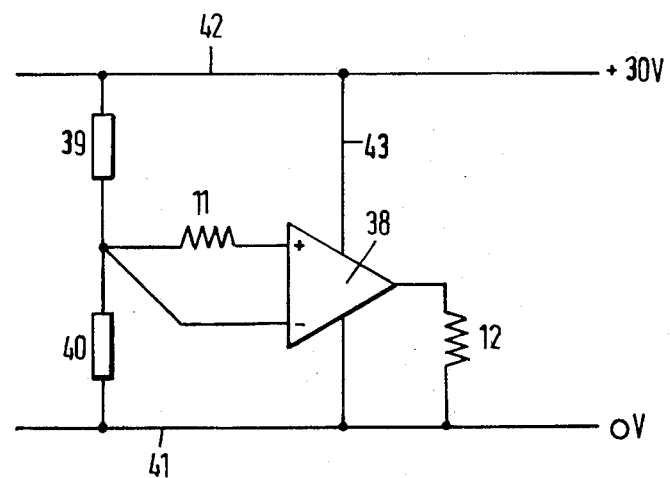
FIG. 3 shows a diagram of an embodiment of a composite seismometer according to the invention which includes a transducer according to the invention.

FIG. 3 shows a diagram in illustration of a possible embodiment, in which a transducer according to the invention is combined with an electronic circuitry so that an acceleration-responsive seismometer is obtained, in which the electric current traversing the drive coil is indicative of the acceleration. In FIG. 3, one coil, such as for example the coil 11 of the transducer shown in FIG. 1 (the so-called measuring coil), is connected to the positive input terminal of an operational amplifier 38. The other end of the measuring coil is connected to the tap of a voltage divider formed by two resistors 39 and 40. This voltage divider is connected between two direct current supply conductors 41 and 42. The drive coil, such as for example the coil 12 in the embodiment shown in FIG. 1, is included in a feedback circuit and hence has its one end connected to the output of the differential amplifier 38 and its other end to the direct current supply conductor 41. The negative input terminal of the operational amplifier is connected to the direct current supply conductor 41. In the embodiment shown in FIG. 3, the electric supply current traversing the supply conductor 43 of the operational amplifier is representative of the electric current traversing drive coil 12. In other words, in this embodiment the supply current is modulated with a quantity that is representative of the acceleration to be measured. The quiescent current flowing through the arrangement has a certain value and may be optionally varied, for example by the selection of the resistors 39 and 40. Furthermore, by selecting the ratio of these resistors, either a "symmetric" or an "asymmetric" drive range can be obtained.

Figure 4:
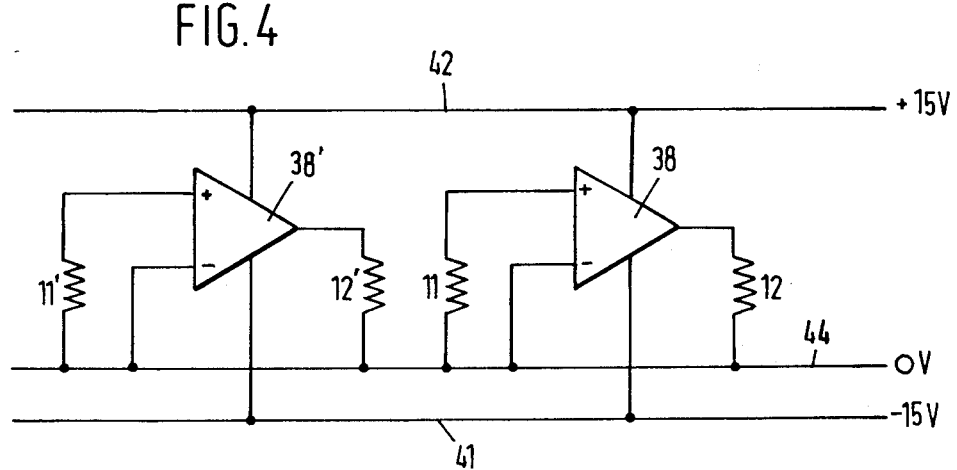
FIG. 4 shows a general diagram of another embodiment of a composite seismometer according to the invention which includes a transducer according to the invention.

FIG. 4 shows a diagram in illustration of another possible embodiment of a combination of a transducer according to the invention and an electronic circuitry. In this embodiment the direct current supply conductors of the operational amplifier 38 are again designated by 41 and 42, and the measuring coil and the drive coil are again designated by 11 and 12. The conductor 44 is an output conductor through which an electric current can flow that is representative of the acceleration to be measured. The embodiment shown in FIG. 4 may be used to advantage if relatively large numbers of transducers (geophones) have to be used. For example, in the event of a hundred groups of ten geophones each, the supply conductors 41 and 42 are common to all of the thousand geophones, while there is one common conductor, such as 44, for each group of ten geophones, which conductor leads to the measuring station. Consequently, for a hundred groups of ten geophones each a total number of a hundred measuring conductors, such as 44, and two supply conductors, i.e. a total number of hundred-and-two conductors, are required in the cable leading to the measuring station. In this embodiment, moreover, the quiescent current flowing through supply conductors 41 and 42 is relatively slight.

We claim:

1. A transducer for picking up mechanical vibrations, in particular seismic waves, comprising:
    a housing;
    a magnet assembly having first and second magnets disposed in said housing for producing first and second permanent magnetic fields;
    a coil system disposed in said housing including two separate coils respectively mounted in corresponding ones of said magnetic fields;
    first means for supporting said magnet assembly and said coil system in said housing for relative movement;
    said magnet assembly including second means defining a magnetic circuit path for electro-magnetically isolating said two separate coils from each other operative to provide a magnetic short-circuit path for dynamic magnetic fields produced by either one of said coils;
    whereby, electromagnetic coupling exists only between respective ones of said two coils and the magnet assembly providing a coupling factor between said two coils substantially equal to zero.

2. A transducer according to claim 1, wehrein said first means includes two substantially flat springs each having a high degree of stiffness in a radial direction substantially normal to the axial direction of said two coils and defined over 360 mechanical degrees.

3. A transducer according to claim 1, wherein said second means is disposed between said two separate coils and has a substantially maximum permeability at the maximum flux produced by the magnet assembly to provide said magnetic short-circuit.

4. A transducer according to claim 1, further including an amplifier, the input of said amplifier is connected to one of said coils and the output of said amplifier is connected in a feedback circuit to the other of said coils.

5. A transducer according to claim 4, further including a current sensitive output circuit, and wherein said other coil included in said feedback circuit is connected to the current-sensitive output circuit for producing an output signal that is representative of the electric current traversing said other coil.

6. A transducer according to claim 5, further including an integrator, and wherein said output circuit is coupled to said integrator for integrating said output signal.

7. A transducer according to claim 5, further including a pair of supply conductors connected to the current-sensitive output circuit, and a single output conductor connected to said other coil.

8. A transducer for picking up mechanical vibrations, in particular seismic waves, comprising:
    a housing;
    a magnet assembly having first and second permanent magnets disposed within the housing for producing first and second permanent magnetic fields;
    first means for supporting the magnet assembly for movement relative to the housing;
    a coil system including two separate coils fixably secured to the housing and respectively disposed within corresponding ones of said magnetic fields;
    said magnet assembly including second means defining a magnetic circuit path for electromagnetically isolating said two separate coils from each other operative to provide a magnetic short-circuit path for dynamic fields produced by either one of said coils;

whereby, electromagnetic coupling exists only between respective ones of said two coils and the magnetic assembly providing a coupling factor between said two coils substantially equal to zero.

9. A transducer according to claim 8, wherein said magnet assembly comprises said two separate permanent magnets mounted in line with each other and coaxially relative to said coils, and wherein said second means is disposed between said two separate coils in such a manner that said two magnets are positioned on opposite sides of said second means.

10. A transducer according to claim 8, wherein said first means includes two substantially flat springs having a high degree of stiffness in a radial direction substantially normal to the axial direction of said two coils and defined over 360 mechanical degrees.

11. A transducer according to claim 9, wherein said second means is disposed between said two separate coils and has a substantially maximum permeability at the magnetic flux produced by the permanent magnets to provide said magnetic short-circuit.

12. A transducer according to claim 8, further including an amplifier, the input of said amplifier is connected to one of said coils and the output of said amplifier is connected in a feedback circuit to the other of said coils.

13. A transducer according to claim 12, further including a current sensitive output circuit, and wherein said other coil included in said feedback circuit is connected to the current-sensitive output circuit for producing an output signal that is representative of the electric current traversing said other coil.

14. A transducer according to claim 13, further including an integrator, and wherein said output circuit is coupled to the integrator for integrating said output signal.

15. A transducer according to claim 13, further including a pair of supply conductors connected to the current-sensitive output circuit, and a single output conductor connected to said other coil.

16. A transducer for picking up mechanical vibrations, in particular seismic waves comprising:
a housing;
a magnet assembly having first and second permanent magnets disposed within said housing for producing first and second permanent magnetic fields;
a coil system disposed within said housing including two separate coils respectively mounted in corresponding ones of said magnetic fields;
first means for supporting said magnetic assembly and said coil system in said housing for movement relative to each other;
said magnet assembly including said two separate first and second permanent magnets which are mounted in line with each other and coaxially relative to said coils;
said magnet assembly including second means defining a magnetic circuit path between said two separate coils such that said two magents are positioned on opposite sides of said magnetic circuit path, said magnetic circuit path is operative to provide a magnetic short-circuit path for dynamic magnetic fields produced by either one of said coils;
whereby, electromagnetic coupling exists only between the respective ones of said coils and the magnet assembly providing a coupling factor between said coils substantially equal to zero.

17. A transducer according to claim 16, wherein said first means includes two substantially flat springs having a high degree of stiffness in a radial direction substantially normal to the axial direction of said two coils, and defined over 360 mechanical degrees.

18. A transducer according to claim 16, wherein said second means between said two separate coils has a substantially maximum permeability at the magnetic flux produced by the permanent magnets to provide said magnet short-circuit.

19. A transducer according to claim 16, further including an amplifier, the input of said amplifier is connected to one of said coils and the output of said amplifier is connected in a feedback circuit to the other of said coils.

20. A transducer according to claim 19, further including a current sensitive output circuit, and wherein said other coil included in said feedback circuit is connected to the current-sensitive output circuit for producing an output signal that is representative of the electric current traversing said other coil.

21. A transducer according to claim 20, further including an integrator, and wherein said output circuit is coupled to the integrator for integrating said output signal.

22. A transducer according to claim 20, further including a pair of supply conductors connected to the current-sensitive output circuit, and a single output conductor connected to said other coil.

23. A transducer for picking up mechanical vibrations, in particular seismic waves, comprising:
a housing;
a magnetic assembly having first and second permanent magnets disposed within the housing for producing first and second magnetic fields;
first and second springs respectively fastened to the ends of the magnetic assembly and connected to said housing for supporting the magnetic assembly for movement relative to said housing;
a coil system including two separate coils respectively mounted in corresponding ones of said magnetic fields and fixably secured to said housing;
said magnetic assembly including two separate magnets mounted in line with each other and coaxially relative to said coils for providing first and second permanent magnetic fields;
each one of said springs has a high degree of stiffness in a direction substantially normal to the axial direction of said two coils;
said magnet assembly including means defining a magnetic circuit path between said two separate coils in such a manner that said two magnets are positioned on opposite sides of said means, said means operative to provide a magnetic short-circuit path for dynamic magnetic fields produced by either one of said coils and having a substantially maximum permeability at the magnetic flux produced by the permanent magnets to provide said magnetic short-circuit so that electromagnetic coupling exists only between respective ones of said two coils and the magnetic assembly to provide a coupling factor between said two coils substantially equal to zero.

24. A transducer according to claim 23, further including an amplifier, the input of said amplifier is connected to one of said coils and the output of said amplifier is connected in a feedback circuit to the other of said coils.

25. A transducer according to claim 24, further including a current sensitive output circuit, and wherein said other coil included in said feedback circuit is connected to said current-sensitive output circuit for producing an output signal that is representative of the electric current traversing said other coil.

26. A transducer according to claim 25, further including an integrator, and wherein said output circuit is coupled to the integrating said output signal.

27. A transducer according to claim 25, further including a pair of supply conductors connected to the current-sensitive output circuit, and a single output conductor connected to said other coil.

* * * * *